(No Model.) 2 Sheets—Sheet 2.

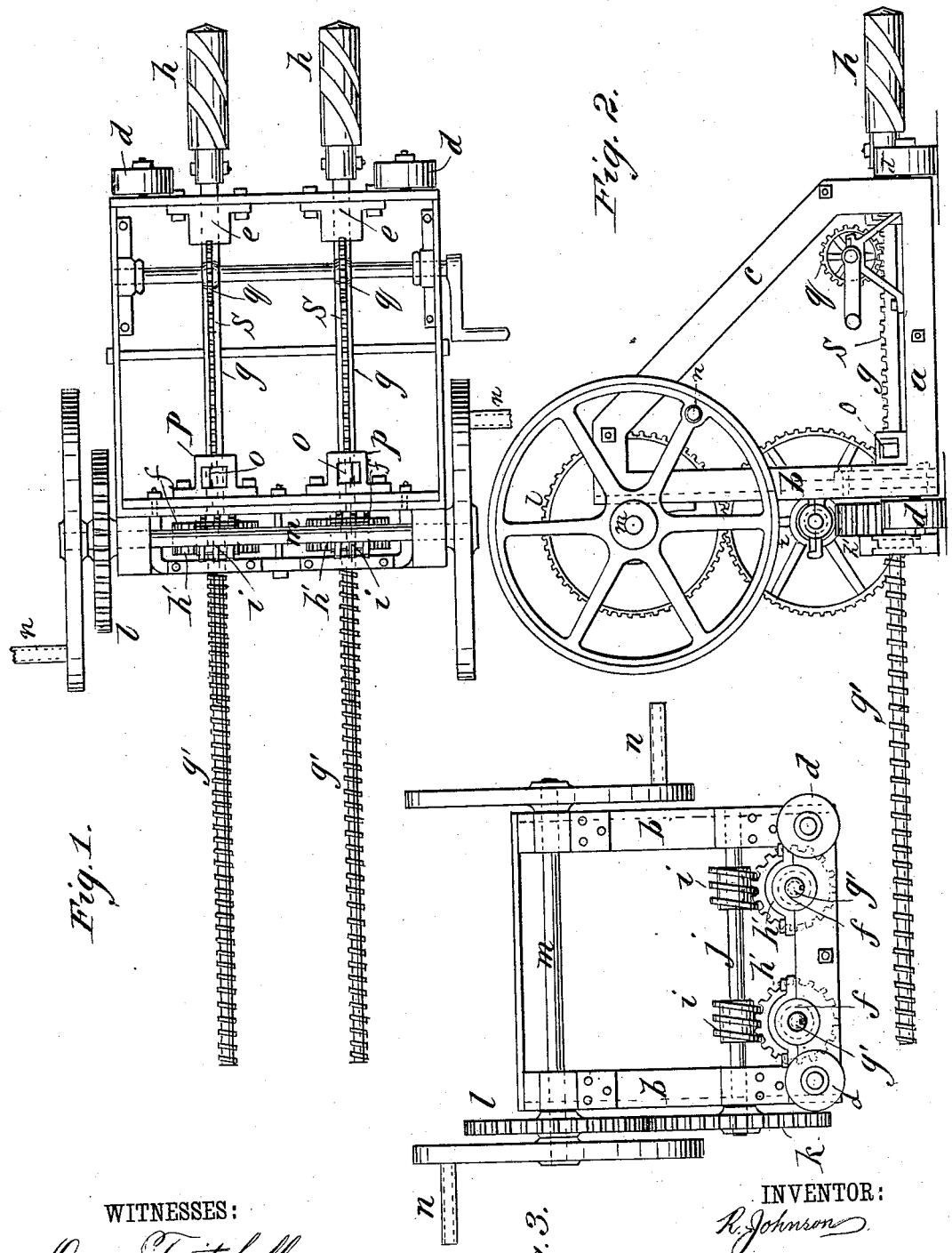

R. JOHNSON.

COAL MINING MACHINE.

No. 284,560. Patented Sept. 4, 1883.

WITNESSES:
Donn Turtchell.
C. Sedgwick

INVENTOR:
R. Johnson
BY Munn & Co.
ATTORNEYS.

UNITED STATES PATENT OFFICE.

RICHARD JOHNSON, OF BELLEVILLE, ILLINOIS.

COAL-MINING MACHINE.

SPECIFICATION forming part of Letters Patent No. 284,560, dated September 4, 1883.

Application filed April 28, 1883. (No model.)

*To all whom it may concern:*

Be it known that I, RICHARD JOHNSON, of Belleville, in the county of St. Clair and State of Illinois, have invented a new and Improved Coal-Mining Machine, of which the following is a full, clear, and exact description.

My invention consists of a series of clay or earth augers, and means for operating them to bore out the clay beneath the coal seams, and also means for quickly withdrawing the augers after the holes are bored, mounted on a truck suitably for moving the machine along, from time to time, square to the work, the object being to provide means for more quickly removing the clay under the coal than it can be dug away by hand, for providing space to enable the coal to be broken down, all as hereinafter fully described.

Reference is to be had to the accompanying drawings, forming part of this specification, in which similar letters of reference indicate corresponding parts in all the figures.

Figure 4:
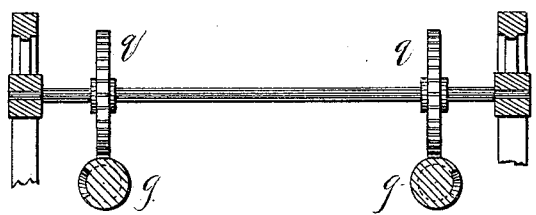
Figure 5:
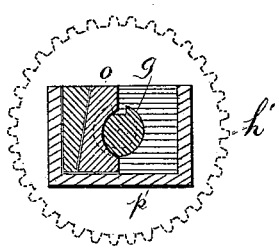

Figure 1 is a plan view of my improved coal-mining machine. Fig. 2 is a side elevation. Fig. 3 is an end elevation. Fig. 4 is a detail sectional view, and Fig. 5 is a similar view, showing the half-nut.

I make a substantial bed-frame, $a$, on one side of which I arrange the upright frame $b$ for the support of the driving-gears, which is stayed from the other side of the bed-frame by the braces $c$. Said frame, which is mounted on low rollers $d$ for moving it along the front of the coal-heading, carries bearings at $e$ and $f$, in the side bars, for the long shafts $g$, which are the auger-shanks of clay or earth augers $h$, which project from the side of the frame whereon the braces $c$ rest. From the opposite side of the bed-frame these shafts extend equal to the length the augers are to be worked into the clay, and they are screw-threaded in the extended parts $g'$, to feed the augers into the work by means of feed-nuts $o$, through which they work, at the same time that they are revolved for turning the augers, which is to be accomplished by means of worm-wheels $h'$, fitted on them with a feather or spline, and made to revolve by the worms $i$ on the shaft $j$, which is geared by the wheels $k$ $l$ with the crank-shaft $m$, to which the power is to be applied by hand, with the crank-pins $n$, the shaft being mounted in the upper part of the upright frame $b$.

For the nuts $o$, through which the screw-shafts are to be forced, we propose to employ one or more half-nuts, $o$, that may be dropped in or otherwise applied to boxes $p$, from which they may be readily removed when it is desired to withdraw the augers, in order that it may be done more quickly by the toothed wheels $q$ and racks $s$, applied to the shafts $g$, than can be done by screwing the augers back, and thus economizing time and labor in the operation of the machine. When the augers are boring into the coal and the half-nuts $o$ are in place in the shafts $g$, the wheels $q$ are mere idlers gearing with the rack $s$; but when it is desired to withdraw the augers from the coal-bed, to save time by more rapidly removing them therefrom the half-nuts are removed from their seats in the shafts $g$, and the wheels $q$, in gear with racks $s$, rapidly revolved backward, thus more rapidly withdrawing the shafts by subjecting them to a backward rectilinear movement without revolving.

Having thus described my invention, what I claim as new, and desire to secure by Letters Patent, is—

1. The combination, in a mining-machine, of the augers $h$, having the shafts fitted with a toothed rack-bar, $s$, also having a screw-section, $g'$, and being geared with feathered driving-wheels $h'$, also with retracting-gears $q$, and also being provided with detachable half-nuts $o$, or equivalent means of disconnecting them from the nuts for withdrawing the augers by the retracting-gears, substantially as described.

2. The combination, in a mining-machine, of a series of augers, $h$, geared with hand-power mechanism, substantially as herein described, for working them, and provided with retracting-gears $q$ $s$, the said augers and the opening-gears being arranged on the bed-frame $a$, having upright $b$ and braces $c$, and being provided with the truck-wheels $d$, substantially as described.

RICHARD JOHNSON.

Witnesses:
 THEOD. I. KROFFT,
 A. G. BADGLEY.